(12) United States Patent
Ikeyama et al.

(10) Patent No.: US 10,843,569 B2
(45) Date of Patent: Nov. 24, 2020

(54) VEHICLE HAVING POWER CONTROL UNIT

(71) Applicants: Toshio Ikeyama, Toyota (JP); Masanori Sugiura, Toyota (JP)

(72) Inventors: Toshio Ikeyama, Toyota (JP); Masanori Sugiura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 14/654,101

(22) PCT Filed: Dec. 12, 2013

(86) PCT No.: PCT/IB2013/002744
§ 371 (c)(1),
(2) Date: Jun. 19, 2015

(87) PCT Pub. No.: WO2014/096923
PCT Pub. Date: Jun. 26, 2014

(65) Prior Publication Data
US 2015/0343904 A1   Dec. 3, 2015

(30) Foreign Application Priority Data

Dec. 21, 2012 (JP) ................ 2012-278897

(51) Int. Cl.
*B60L 3/04* (2006.01)
*B60L 3/12* (2006.01)
(Continued)

(52) U.S. Cl.
CPC .............. *B60L 3/04* (2013.01); *B60L 3/0007* (2013.01); *B60L 3/0061* (2013.01);
(Continued)

(58) Field of Classification Search
CPC .......... Y02T 90/16; B60L 3/04; B60L 3/0007
(Continued)

(56) References Cited

U.S. PATENT DOCUMENTS 5,492,189 A * 2/1996 Kriegler ................ B60K 6/387
180/65.23
2003/0098211 A1 * 5/2003 Saito ................ B60G 17/0185
191/3

(Continued)

FOREIGN PATENT DOCUMENTS

JP    2005-020952 A    1/2005
JP    2005-031967 A    2/2005
(Continued)

*Primary Examiner* — Charles A Fox
*Assistant Examiner* — Michael E Butler
(74) *Attorney, Agent, or Firm* — Sughrue Mion, PLLC

(57) ABSTRACT

A vehicle in one exemplary embodiment of the present invention includes a power control unit, a first control unit, and a second control unit. The first control unit further acquires collision prediction information indicating whether there is a possibility that the vehicle will collide and executes the discharge control if (i) the collision information is received, (ii) an abnormality occurs in the communication with the second control unit and, the collision prediction information indicates that there is a possibility that the vehicle will collide, or (iii) a voltage of an auxiliary power supply becomes lower than a threshold voltage and, the collision prediction information indicates that there is a possibility that the vehicle will collide.

4 Claims, 3 Drawing Sheets

(51) Int. Cl.
*B60L 3/00* (2019.01)
*B60L 15/00* (2006.01)
*B60L 50/16* (2019.01)
*B60L 58/20* (2019.01)
*B60L 50/40* (2019.01)
*B60L 50/61* (2019.01)

(52) U.S. Cl.
CPC .............. *B60L 3/0084* (2013.01); *B60L 3/12* (2013.01); *B60L 15/007* (2013.01); *B60L 50/16* (2019.02); *B60L 50/40* (2019.02); *B60L 50/61* (2019.02); *B60L 58/20* (2019.02); *B60L 2210/14* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2250/10* (2013.01); *B60L 2260/50* (2013.01); *Y02T 10/62* (2013.01); *Y02T 10/64* (2013.01); *Y02T 10/70* (2013.01); *Y02T 10/7072* (2013.01); *Y02T 10/72* (2013.01); *Y02T 90/16* (2013.01); *Y10S 903/907* (2013.01)

(58) Field of Classification Search
USPC .......................................................... 701/22
See application file for complete search history.

(56) References Cited

U.S. PATENT DOCUMENTS

| | | | |
|---|---|---|---|
| 2006/0137929 A1 | 6/2006 | Yoshida | |
| 2007/0197336 A1* | 8/2007 | Tabata | B60K 6/445 475/150 |
| 2010/0214055 A1* | 8/2010 | Fuji | H02H 9/001 340/3.1 |
| 2010/0271256 A1 | 10/2010 | Tsunekawa | |
| 2012/0063044 A1* | 3/2012 | Fukuyama | B60L 3/00 361/62 |
| 2012/0068532 A1* | 3/2012 | Tanabe | B60L 3/04 307/10.1 |
| 2013/0049663 A1* | 2/2013 | Amano | B60L 3/0007 318/453 |
| 2013/0307480 A1* | 11/2013 | Boggs | B60L 3/00 320/118 |
| 2014/0095005 A1* | 4/2014 | Kanzaki | B60L 15/007 701/22 |
| 2015/0051771 A1* | 2/2015 | Greenwood | H02J 7/0029 701/22 |
| 2015/0102666 A1* | 4/2015 | Izumi | B60L 3/12 307/10.1 |
| 2015/0108951 A1* | 4/2015 | Yamaguchi | H02J 7/0047 320/136 |

FOREIGN PATENT DOCUMENTS

| | | |
|---|---|---|
| JP | 2005-141517 A | 6/2005 |
| JP | 2006-182300 A | 7/2006 |
| JP | 2007-310572 A | 11/2007 |
| JP | 2008-285124 A | 11/2008 |
| JP | 2009-073282 A | 4/2009 |
| JP | 2009-220607 A | 10/2009 |
| JP | 2010-072947 A | 4/2010 |
| JP | 2011-259517 A | 12/2011 |
| JP | 2012-022628 A | 2/2012 |
| JP | 2013-090424 A | 5/2013 |
| WO | 2008/079062 A1 | 7/2008 |
| WO | 2010/064282 A1 | 6/2010 |
| WO | 2010/140031 A2 | 12/2010 |
| WO | 2012/164680 A1 | 12/2012 |
| WO | 2013/057571 A2 | 4/2013 |

* cited by examiner

VEHICLE HAVING POWER CONTROL UNIT

BACKGROUND OF THE INVENTION

1. Field of the Invention

The present invention relates to a vehicle having a power control unit, such as a converter and an inverter, that controls power for driving a motor.

2. Description of Related Art

A vehicle (for example, a hybrid vehicle, an electric vehicle), in which a motor for traveling is mounted, usually includes a boost converter and an inverter. In many cases, a boost converter and an inverter are provided with a capacitor (smoothing capacitor) for smoothing the output voltage. Because a motor mounted on a vehicle requires high power, a large-capacity capacitor is used as the smoothing capacitor.

It is therefore required that, when a vehicle collision occurs, the electric charge stored in the smoothing capacitor be decreased as soon as possible, that is, the smoothing capacitor be discharged as soon as possible after the vehicle collision. Thus, one of the devices in the related art has an acceleration sensor for detecting a vehicle collision and, when a vehicle collision is detected, discharges the smoothing capacitor (for example, see Japanese Patent Application Publication No. 2011-259517 (JP 2011-259517 A).

In a configuration where separate control units, one for detecting a vehicle collision or acquiring a vehicle collision signal detected by another control unit and the other for instructing a smoothing capacitor to discharge, are provided, the collision detection signal (collision information) indicating a vehicle collision is transmitted via communications between the control units. In that case, if a vehicle collision occurs and the communication between the control units does not function properly, the control unit for instructing a smoothing capacitor to discharge cannot receive the collision detection signal and therefore cannot discharge the smoothing capacitor.

Meanwhile, when a vehicle collision occurs, one or both of the following conditions are generated in many cases. That is, an abnormality is generated in the communication between the control units due to a disconnection in the communication line (a communication abnormality between the control units) or the voltage of the auxiliary power supply, which supplies power to die control units, becomes lower than the threshold voltage (a voltage drop in the auxiliary power supply). Thus, one sure way to discharge a smoothing capacitor when a vehicle collision occurs is to discharge the smoothing capacitor when one or both of a communication abnormality between the control units and a voltage drop in the auxiliary power supply is detected, assuming that a vehicle collision has occurred.

However, one or both of a communication abnormality between the control units and a voltage drop in the auxiliary power supply may occur in a case other than a vehicle collision. This means that a discharge, if performed as described above, may lead to a heavy, unnecessary load (stress) on the devices associated the discharge. The devices associated with the discharge are the devices, such as discharging resistors and discharging switching devices, through which the discharge current flows. As a result, those devices may sometimes be deteriorated by the discharge.

SUMMARY OF THE INVENTION

The present invention provides a vehicle that can discharge a smoothing capacitor at a vehicle collision time while avoiding an unnecessary discharging of the smoothing capacitor.

According to a first aspect of the present invention, a vehicle comprises a motor; a power control unit that includes a capacitor and a discharge execution unit, which executes discharge control for reducing electric charges stored in the capacitor, and that controls power to be supplied to the motor; a first control unit configured to send a control instruction signal, which controls the power, to the power control unit, and to send an instruction to the discharge execution unit to execute the discharge control if a collision information indicating that the vehicle has collided is received; and a second control unit configured to acquire collision information, and to send the acquired collision information to the first control unit via communication.

The first control unit sends an instruction to the discharge execution unit to execute the discharge control if the collision information is received. The first control unit acquires collision prediction information indicating whether there is a possibility that the vehicle will collide and, sends an instruction to the discharge execution unit to execute the discharge control either if an abnormality occurs in a communication with the second control unit and, the collision prediction information indicates that there is a possibility that the vehicle will collide or if a voltage of an auxiliary power supply, which is mounted in the vehicle and supplies power to the first control unit and the second control unit, becomes lower than a threshold voltage and, the collision prediction information indicates that there is a possibility that the vehicle will collide.

The vehicle in the first aspect of the present invention may be configured in such a way that the first control unit acquires the collision prediction information by receiving the collision prediction information from the second control unit via communication.

According to a second aspect of the present invention, a vehicle comprises a power control unit that includes a capacitor and a discharge execution unit, which is configured to execute discharge control for reducing electric charges stored in the capacitor, and which controls power to be supplied to the motor, a first control unit configured to send a control instruction signal, which controls the power, to the power control unit, and a second control unit configured to communicate with the first control unit. The first control unit acquires collision prediction information indicating whether there is a possibility that the vehicle will collide and, sends an instruction to the discharge execution unit to execute the discharge control, if an abnormality occurs in a communication with the second control unit and, the collision prediction information indicates that there is a possibility that the vehicle will collide.

According to a second aspect of the present invention may be configured in such a way that the second control unit is configured to acquire collision information indicating that the vehicle has collided, and to send the acquired collision information to the first control unit via communication, and the first control unit is configured to send an instruction to the discharge execution unit to execute the discharge control if the collision information is received from the second control unit.

According to a third aspect of the present invention, a vehicle comprises a power control unit that includes a capacitor and a discharge execution unit, which is configured to execute discharge control for reducing electric charges stored in the capacitor, and that controls power to be supplied to the motor, a first control unit configured to send a control instruction signal, which controls the power, to the power control unit, and an auxiliary power supply that supplies operating power to the first control unit. The first control unit acquires collision prediction information indicating whether there is a possibility that the vehicle will collide and, sends an instruction to the discharge execution unit if a voltage of the auxiliary power supply becomes lower than a threshold voltage and, the collision prediction information indicates that there is a possibility that the vehicle will collide.

According to a third aspect of the present invention may be configured in such a way that the vehicle further comprises a second control unit configured to acquire collision information indicating that the vehicle has collided, and to send the acquired collision information to the first control unit via communication, and the first control unit sends an instruction to the discharge execution unit to execute the discharge control if the collision information is received from the second control unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A vehicle in one exemplary embodiment of the present invention is described below with reference to the drawings. The vehicle in one exemplary embodiment of the present invention is a hybrid vehicle in which a motor and an internal-combustion engine are mounted as the vehicle-driving source. However, it should be noted that the present invention is applicable to a vehicle in which a motor is mounted such as an electric vehicle and a fuel-cell vehicle.

Figure 1:
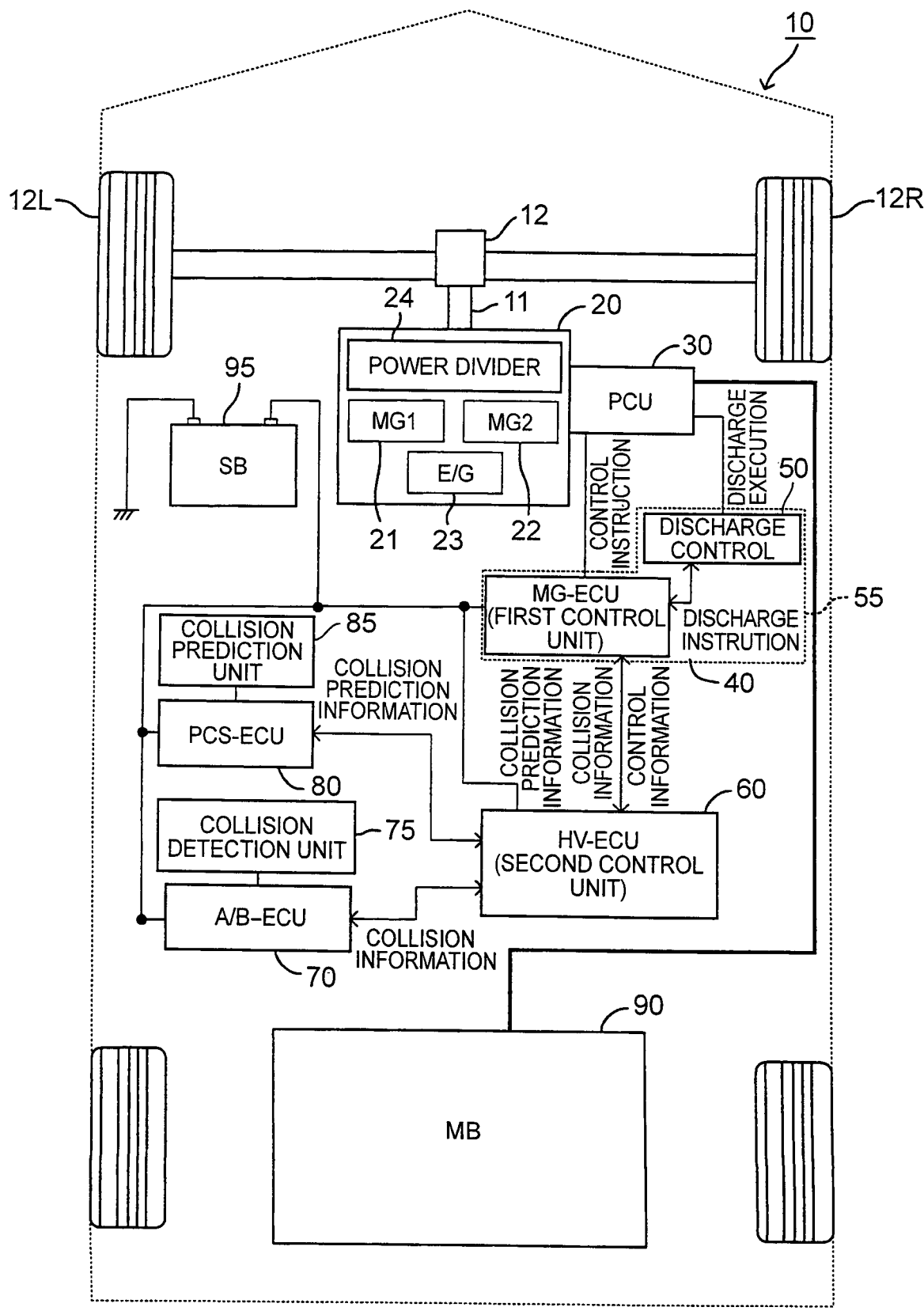
FIG. 1 is a diagram showing the general configuration of a vehicle in one exemplary embodiment of the present invention.

As shown in FIG. 1, a vehicle 10 in one exemplary embodiment of the present invention includes a power generation unit 20, a power control unit 30, an MG-ECU 40, a discharge control circuit 50, an HV-ECU 60, an A/B-ECU 70, a PCS-ECU 80, a main battery (main power storage device MB) 90, and a sub-battery (auxiliary battery SB) 95. An ECU is an abbreviation for an electronic control unit. An ECU includes a known microcomputer, a driving circuit, and so on.

The power generation unit 20 includes a first motor generator 21, a second motor generator 22, an internal combustion engine 23, and a power divider 24.

The first motor generator 21, primarily used as a generator, also performs cranking for the internal combustion engine 23 when it is started. The first motor generator 21 is denoted also as MG1. The second motor generator 22, primarily used as a motor, generates the driving force of the hybrid vehicle 10. The second motor generator 22 is denoted also as MG2. The internal combustion engine 23, a gasoline fuel engine, has the intake air volume and the injection quantity controlled by an engine ECU, not shown, to generate torque. MG is an abbreviation for a motor generator.

The power from the first motor generator 21, second motor generator 22, and internal combustion engine 23 is converted to the driving force of the vehicle by the known power divider 24 that includes a planetary gear mechanism. The driving force of the vehicle is then transmitted to driving wheels 12L and 12R via a differential gear 12.

The power control unit 30 is also called a PCU. As will be described in detail later, the power control unit 30 includes devices such as a boost converter, first and second inverters, a first smoothing capacitor, a second smoothing capacitor, and a discharge execution unit. The power control unit 30 uses these devices to convert the power, supplied from the main battery 90, and supplies the converted power to the first motor generator 21 and the second motor generator 22. That is, the power control unit 30 controls the power supplied to the first motor generator 21 and the second motor generator 22 that are motors. The first motor generator 21 and the second motor generator 22 each include therein a rotor and a stator. The rotor has a permanent magnet. The stator has three-phase coil windings.

The MG-ECU 40 sends the control instruction signal to the power control unit 30 based on the control information transmitted from the HV-ECU 60. The control instruction signal is a signal used by the power control unit 30 to control the power to be supplied to the first motor generator 21 and the second motor generator 22. The MG-ECU 40 communicates with the discharge control circuit 50. That is, when a predetermined condition (discharge condition) is satisfied, the MG-ECU 40 sends the discharge instruction signal to the discharge control circuit 50 via communication. The predetermined condition (discharge condition) is described later. The MG-ECU 40, with a backup power supply therein, is configured to allow the minimum operation to be performed even when the vehicle 10 collides.

The discharge control circuit 50 sends the instruction (discharge execution instruction signal) that discharges the second smoothing capacitor included in the power control unit 30. When the discharge instruction signal is received from the MG-ECU 40, the discharge control circuit 50 sends the discharge execution instruction signal. The discharge execution instruction signal is sent to the discharge execution unit in the power control unit 30. The discharge control circuit 50, with a backup power supply therein, is configured to allow the operation to be performed even when the vehicle 10 collides. The MG-ECU 40 and the discharge control circuit 50 configure a first control unit 55.

The HV-ECU 60, connected to various sensors not shown, acquires information about the torque required by the driver and the speed of the vehicle 10. In addition, the HV-ECU 60 communicates with various ECUs, including the MG-ECU 40, A/B-ECU 70, PCS-ECU 80, and other ECUs not shown, to exchange information with the various ECUs. The HV-ECU 60 determines the state of operation to be performed by the first motor generator 21, second motor generator 22, and internal combustion engine 23 and sends the information about the determined operation state to the MG-ECU 40 and an engine ECU not shown.

The A/B-ECU (air bag ECU) 70 is connected to a collision detection unit 75 that includes an acceleration sensor. Based on the signal from the collision detection unit 75, the A/B-ECU 70 obtains collision information (collision detection signal) indicating that the vehicle 10 has collided. When the collision information is received, the A/B-ECU 70 expands a known air bag not shown. When the collision information is received, the A/B-ECU 70 sends the collision information to the HV-ECU 60 via communication.

The PCS-ECU (pre-crash safety system—ECU) 80 is connected to a collision prediction unit 85 that includes a millimeter wave sensor, a radar, and a CCD (Charge Coupled Device) camera. The PCS-ECU 80 obtains collision prediction information, which indicates whether the vehicle 10 will collide, from the collision prediction unit 85. When the collision prediction information indicates that the vehicle 10 will collide, the PCS-ECU 80 turns on a warning light not shown, generates a warning sound, tightens a loose seatbelt, or operates the brake device of the vehicle 10. The operation performed by the PCS-ECU 80 in this way increases the safety of the vehicle 10. The PCS-ECU 80 sends the collision prediction information to the HV-ECU 60 via communication. The pre-crash safety system is a known system disclosed, for example, in Japanese Patent Application Publication No. 2005-141517 (JP 2005-141517 A), Japanese Patent Application Publication No. 2007-310572 (JP 2007-310572 A), Japanese Patent Application Publication No. 2009-73282 (JP 2009-73282 A), Japanese Patent Application Publication No. 2010-72947 (JP 2010-72947 A), Japanese Patent Application Publication No. 2005-31967 (JP 2005-31967 A), and Internal Publication WO2010/064282.

The main battery 90 is a secondary battery capable of charging and discharging. The secondary battery, a lithium ion battery in this exemplary embodiment, may be a nickel-metal hydride battery or any other secondary battery. The main battery 90 supplies DC power to the power control unit 30.

The sub-battery (auxiliary battery) 95 supplies power to the electric devices, not shown, such as the headlight and the power window and, at the same time, supplies DC power to the ECUs, such as the MG-ECU 40 and the HV-ECU 60, for operating these ECUs. The sub-battery 95 is called also as an auxiliary power supply. The voltage of the sub-battery 95 is denoted as a voltage VB.

Figure 2:
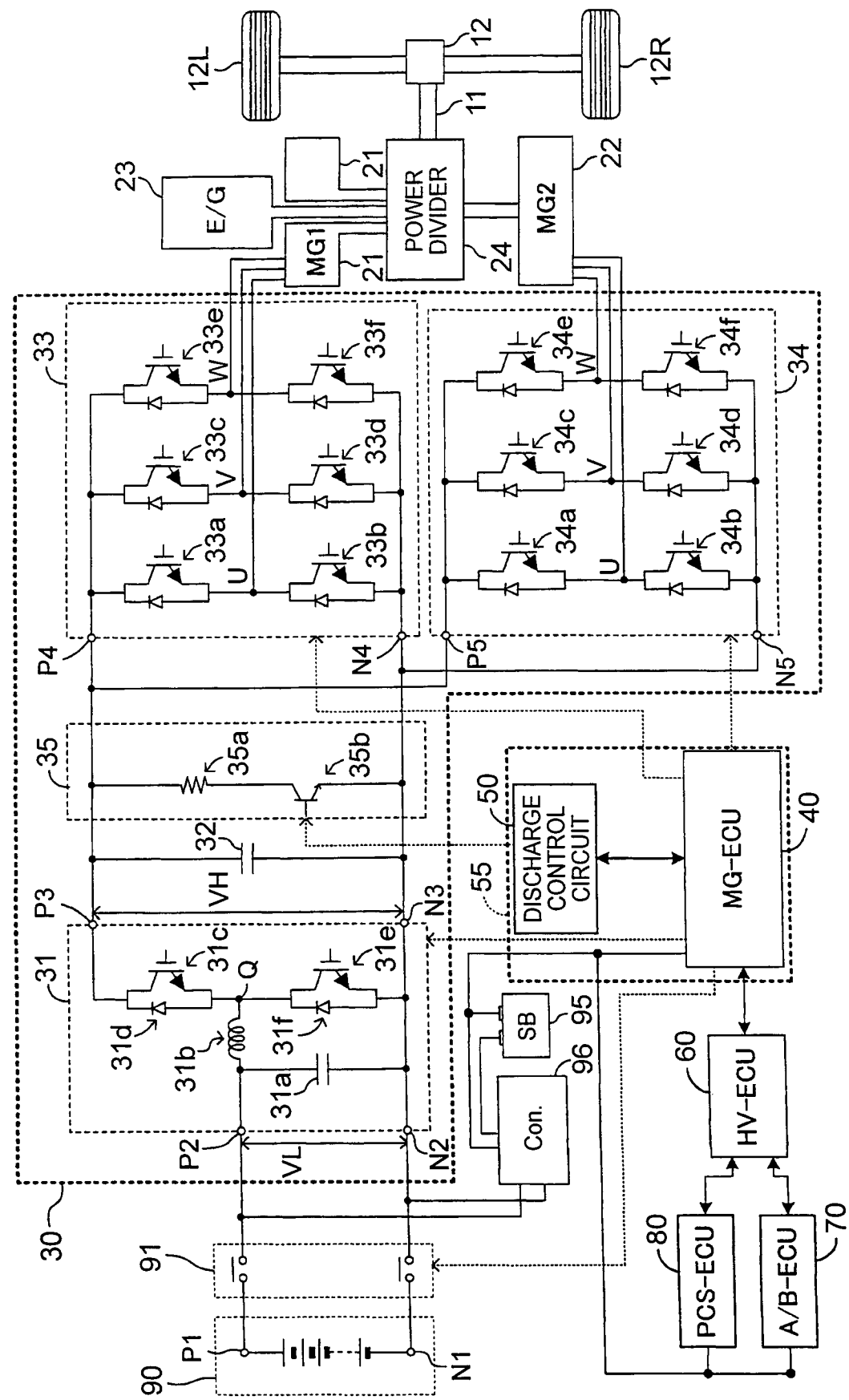
FIG. 2 is a diagram showing the detailed circuit of the power control unit shown in FIG. 1.

Next, the power control unit 30 and the MG-ECU 40 are described in detail below with reference to FIG. 2.

The power control unit 30 includes a boost converter 31, a smoothing capacitor (second smoothing capacitor) 32, a first inverter 33, and a second inverter 34.

The low-voltage side terminal units (P2, N2) of the boost converter 31 are connected to the positive electrode terminal and the negative electrode terminal (P1, N1) of the main battery 90 via a system main relay 91. The system main relay 91 can selectively generate one of the path disconnection state (off state) and the path connection state (on state) based on the signal from the MG-ECU 40.

The boost converter 31 includes a pair of low-voltage side terminal units (P2, N2) described above and a pair of high-voltage side terminal units (P3, N3). The boost converter 31 includes a capacitor (first smoothing capacitor) 31a, a reactor 31b, a first IGBT 31c, a diode 31d, a second IGBT 31e, and a diode 31f. These components are connected as shown in the figure. In the boost converter 31, the first IGBT 31c and the second IGBT 31e are switched. The first IGBT 31c and the second IGBT 31e are switched based on the PWM signal (control instruction signal) from the MG-ECU 40. The switching operation performed in this way causes the boost converter 31 to convert the low-voltage side voltage VL across the low-voltage side terminal units (P2, N2) to the high-voltage side voltage VH across the high voltage side terminal units (P3, N3). A further description of the boost converter 31 is omitted here because the boost converter 31 is known. In the boost converter 31, a power MOSFET (metal oxide semiconductor field effect transistor) may also be used in place of an IGBT (insulated gate bipolar transistor).

The smoothing capacitor (second smoothing capacitor) 32 is connected between the high-voltage side terminal units (P3, N3). The smoothing capacitor 32 smoothes the high-voltage side voltage VH output from the boost converter 31. Therefore, the voltage across the ends of the smoothing capacitor 32 increases with the result that a large amount of electric charges is stored in the smoothing capacitor 32.

The first inverter 33 includes a pair of input terminal units (P4, N4). The input terminal units (P4, N4) of the pair are connected respectively to the high-voltage side terminal units (P3, N3) of the pair in the boost converter 31. The first inverter 33 includes six IGBTs 33a-33f. A diode is connected in reverse-parallel to each of the IGBTs 33a-33f. The first inverter 33 also includes a U-phase arm, a V-phase arm, and a W-phase arm. These arms, each inserted between a pair of input terminal units (P4, N4), are connected in parallel to each other.

The U-phase arm of the first inverter 33 includes the IGBT 33a and the IGBT 33b. The connection point between the IGBT 33a and the IGBT 33b is connected to the U-phase coil, not shown, of the first motor generator 21. The V-phase arm of the first inverter 33 includes the IGBT 33c and the IGBT 33d. The connection point between the IGBT 33c and the IGBT 33d is connected to the V-phase coil, not shown, of the first motor generator 21. The W-phase arm of the first inverter 33 includes the IGBT 33e and the IGBT 33f. The connection point between the IGBT 33e and the IGBT 33f is connected to the W-phase coil, not shown, of the first motor generator 21.

In the first inverter 33, the IGBTs are switched to convert the DC power between the input terminal units (P4, N4) to three-phase AC power and output the converted three-phase AC power to the first motor generator 21. The IGBTs are switched based on the PWM signal (control instruction signal) from the MG-ECU 40. A further description of the first converter 33 is omitted here because the first converter 33 is a known inverter. Note that the first inverter 33 can also convert three-phase AC power, output by the first motor generator 21, to DC power.

The second inverter 34 includes a pair of input terminal units (P5, N5). The input terminal units (P5, N5) of the pair are connected respectively to the high-voltage side terminal units (P3, N3) of the pair in the boost converter 31. The second inverter 34 includes six IGBTs 34a-34f. A diode is connected in reverse-parallel to each of the IGBTs 34a-34f. The second inverter 34 also includes a U-phase arm, a V-phase arm, and a W-phase arm. The U-phase arm, V-phase arm, and W-phase arm, each inserted between a pair of input terminal units (P5, N5), are connected in parallel to each other.

The U-phase arm of the second inverter 34 includes the IGBT 34a and the IGBT 34b. The connection point between the IGBT 34a and the IGBT 34b is connected to the U-phase coil, not shown, of the second motor generator 22. The V-phase arm of the second inverter 34 includes the IGBT 34c and the IGBT 34d. The connection point between the IGBT 34c and the IGBT 34d is connected to the V-phase coil, not shown, of the second motor generator 22. The W-phase arm of the second inverter 34 includes the IGBT 34e and the IGBT 34f. The connection point between the IGBT 34e and the IGBT 34f is connected to the W-phase coil, not shown, of the second motor generator 22.

In the second inverter 34, the IGBTs are switched, as in the first inverter 33, to convert the DC power between the input terminal units (P4, N4) to three-phase AC power and output the converted three-phase AC power to the second motor generator 22. The IGBTs are switched based on the PWM signal (control instruction signal) from the MG-ECU 40. A further description of the second inverter 34 is omitted here because the second inverter 34 is a known inverter. Note that the second inverter 34 can also convert three-phase AC power, output by the second motor generator 22, to DC power.

In addition, the power control unit 30 includes a discharge execution unit 35. The discharge execution unit 35 includes a resistor (discharge resistor) 35a and a switching device 35b that are connected in series to each other. The discharge execution unit 35 is connected in parallel to the smoothing capacitor 32. That is, the discharge execution unit 35 is installed between a pair of high-voltage side terminal units (P3, N3).

The gate (base) potential of the switching device 35b is changed based on the instruction (discharge execution instruction signal) from the discharge control circuit 50. Therefore, the state of the switching device 35b is changed from the off-state (non-conduction state) to the on-state (conduction state) according to the discharge execution instruction signal from the discharge control circuit 50. When the switching device 35b is changed to the on-state, the smoothing capacitor 32 is discharged. That is, the electrical charge remained (held) in the smoothing capacitor 32 is decreased via the resistor 35a. The sub-battery 95 is charged by the voltage between the low-voltage side terminal units (P2, N2) of the boost converter 31 via a converter 96.

Next, the following describes how the vehicle, configured as described above, performs the discharge control of the smoothing capacitor 32. The MG-ECU 40 determines whether at least one of condition 1 to condition 3 described below is satisfied. If at least one of condition 1 to condition 3 is satisfied, the MG-ECU 40 determines that the discharge condition is satisfied. If the discharge condition is satisfied, the MG-ECU 40 sends a discharge execution instruction (discharge instruction signal) to the discharge control circuit 50 via communication. When the discharge instruction signal is received, the discharge control circuit 50 sends the discharge execution instruction signal to the switching device 35b. By doing so, the discharge control circuit 50 changes the state of the switching device 35b from the off-state to the on-state. As a result, the smoothing capacitor 32 is discharged quickly.

Condition 1: Condition 1 stipulates that collision information is received. The collision information is a signal indicating that the vehicle 10 has collided. The collision information is sent from the A/B-ECU 70 to the HV-ECU 60 via communication. After that, the collision information is sent from the HV-ECU 60 to the MG-ECU 4 via communication.

Condition 2: Condition 2 stipulates that an abnormality occurs in the communication between the HV-ECU 60 and the MG-ECU 40 and, in addition, the collision prediction information indicates a possibility that the vehicle 10 will collide.

For example, the HV-ECU 60 sends control information to the MG-ECU 40 at a predetermined time interval. Therefore, when control information is not received from the HV-ECU 60 for a predetermined threshold time or longer, the MG-ECU 40 determines that an abnormality has occurred in the communication between the HV-ECU 60 and the MG-ECU 40. The collision prediction information is sent from the PCS-ECU 80 to the HV-ECU 60 via communication. After that, the collision prediction information is sent from the HV-ECU 60 to the MG-ECU 40 via communication. When the collision prediction information does not indicate a possibility that the vehicle 10 will collide, the MG-ECU 40 maintains 0 as the value of the pre-crash flag (collision prediction flag) XPCSH stored in the RAM in the MG-ECU 40. When the collision prediction information indicates a possibility that the vehicle 10 will collide, the MG-ECU 40 sets the value of the pre-crash flag XPCSH to 1.

When the vehicle 10 collides, an abnormality may occur in the communication between the HV-ECU 60 and the MG-ECU 40. In this case, the MG-ECU 40 cannot obtain the collision information and, therefore, cannot perform the discharge control of the smoothing capacitor 32. Thus, the MG-ECU 40 performs the discharge control of the smoothing capacitor 32 when an abnormality occurs in the communication between the HV-ECU 60 and the MG-ECU 40. However, an abnormality in the communication between the HV-ECU 60 and the MG-ECU 40, if generated, does not always mean that the vehicle 10 has collided. In other words, though there is a high possibility that an abnormality occurs in the communication between the HV-ECU 60 and the MG-ECU 40 when the vehicle 10 has collided, a communication abnormality in the communication between the HV-ECU 60 and the MG-ECU 40 may occur even if the vehicle 10 does not collide. Considering this fact, a condition that the collision prediction information indicates a possibility that the vehicle 10 will collide is added to condition 2. As a result, adding this condition avoids an unnecessary discharge of the smoothing capacitor 32, thus reducing the frequency at which a wasteful load (stress) is placed on the resistor 35a and the switching device 35b.

Condition 3: Condition 3 stipulates that the voltage of the sub-battery 95 (that is, the voltage of the auxiliary power supply) VB is lower than the threshold voltage VBth and, in addition, the collision prediction information indicates a possibility that the vehicle 10 will collids. The threshold voltage VBth is set to the minimum voltage at which the ECUs can operate.

When the vehicle 10 collides, the voltage VB of the sub-battery 95 may become lower than the threshold voltage VBth. However, even when the voltage VB of the sub-battery 95 becomes lower than the threshold voltage VBth, the reduction in the voltage VB does not always mean that the vehicle 10 has collided. That is, though there is a high possibility that the voltage VB becomes lower than the threshold voltage VBth when the vehicle 10 has collided, a reduction in the voltage VB may occur even if the vehicle 10 does not collide. Considering this fact, another condition that the collision prediction information indicates a possibility that the vehicle 10 will collide is added to condition 3. As a result, adding this condition avoids an unnecessary discharge of the smoothing capacitor 32 (a discharge performed when the vehicle 10 does not collide), thus reducing the frequency at which a wasteful load (stress) is placed on the resistor 35a and the switching device 35b.

Figure 3:
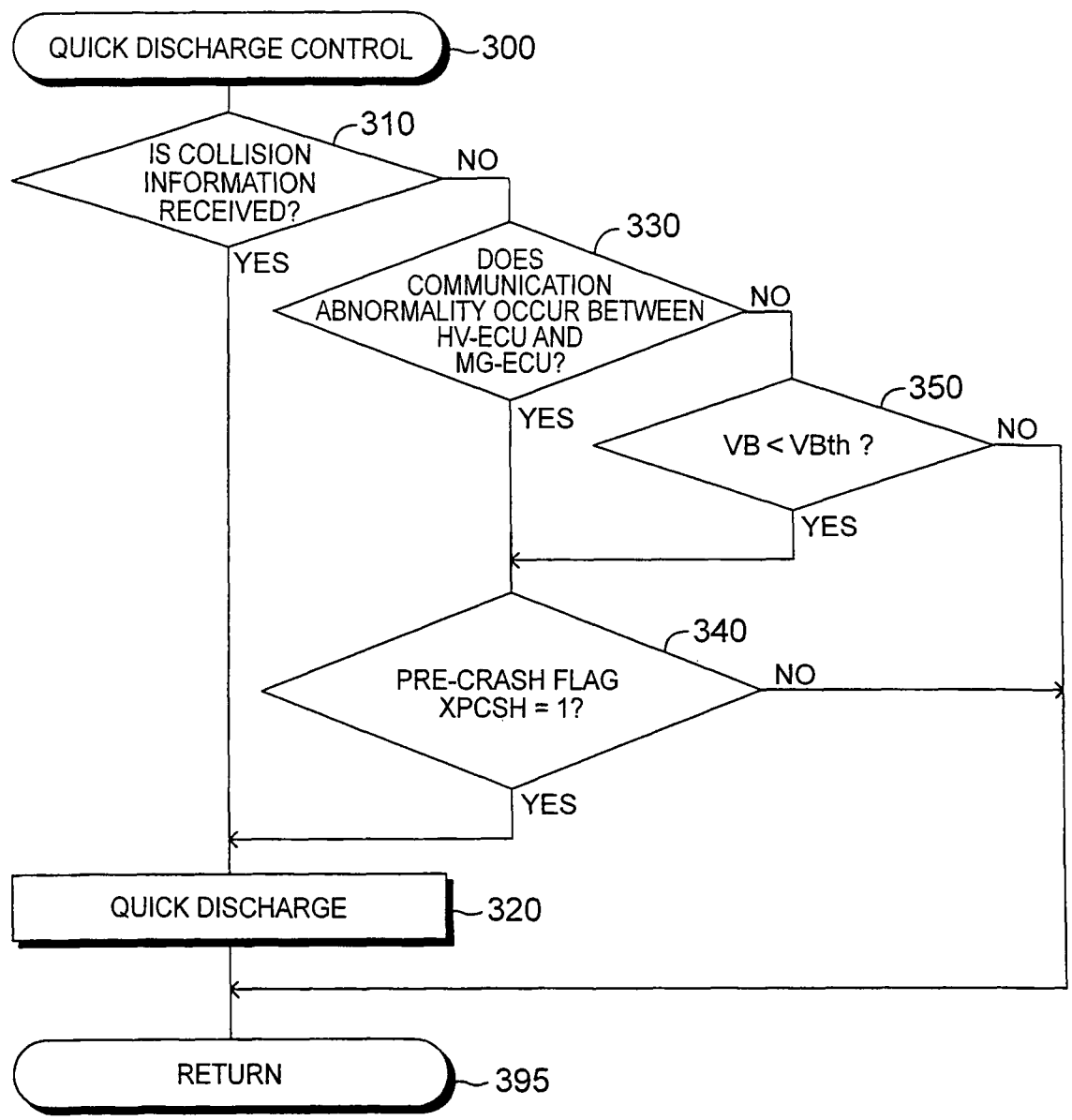
FIG. 3 is a flowchart showing the routine executed by the CPU of the MG-ECU shown in FIG. 1.

Next, with reference to FIG. 3, the following describes how the MG-ECU 40 performs the discharge control of the smoothing capacitor 32. Each time a predetermined time elapses, the CPU of the MG-ECU 40 (hereinafter called simply CPU) starts the processing, beginning at step 300. CPU is an abbreviation for a central processing unit.

When the processing is started in step 300, the CPU proceeds to step 310 to determine whether the collision information is received. If the collision information is received, it is determined Yes in step 310 and the CPU proceeds to step 320. In step 320, the CPU sends the discharge execution instruction signal (discharge instruction signal) to the discharge control circuit 50 via communication. As a result, the state of the switching device 35b changes from the off-state to the on-state, causing the smoothing capacitor 32 to quickly discharge. This processing corresponds to the processing when condition 1 described above is satisfied.

If the collision information is not received when the CPU executes the processing in step 310, it is determined No in step 310 and the CPU proceeds to step 330. In step 330, the CPU determines whether an abnormality occurs in the communication between the HV-ECU 60 and the MG-ECU 40. If an abnormality occurs in the communication between the HV-ECU 60 and the MG-ECU 40, it is determined Yes in step 330 and the CPU proceeds to step 340. In step 340, the CPU determines whether the value of the pre-crash flag (collision prediction flag) XPCSH is 1. That is, the CPU determines whether the collision prediction information indicates a possibility that the vehicle 10 will collide.

If the value of the pre-crash flag XPCSH is 1, it is determined Yes in step S340 and the CPU proceeds to step 320. As a result, the state of the switching device 35b changes from the off-state to the on-state, causing the smoothing capacitor 32 to quickly discharge. This processing corresponds to the processing when condition 2 described above is satisfied.

On the other hand, if an abnormality does not occur in the communication between the HV-ECU 60 and the MG-ECU 40 when the CPU executes the processing in step 330, it is determined No in step 330 and the CPU proceeds to step 350. In step 350, the CPU determines whether the voltage VB of the sub-battery 95 is lower than the threshold voltage VBth.

If the voltage VB of the sub-battery 95 is lower than the threshold voltage VBth, it is determined Yes in step 350 and the CPU proceeds to step 340. In step 340, the CPU determines whether the value of the pre-crash flag XPCSH is 1. That is, the CPU determines whether the collision prediction information indicates a possibility that the vehicle 10 will collide.

If the value of the pre-crash flag XPCSH is 1, it is determined Yes in step 340 and the CPU proceeds to step 320. As a result, the state of the switching device 35b changes from the off-state to the on-state, causing the smoothing capacitor 32 to quickly discharge. This processing corresponds to the processing when condition 3 described above is satisfied.

On the other hand, if the value of the pre-crash flag XPCSH is 0 when the CPU executes the processing in step 340, it is determined No in step 340 and the CPU proceeds directly to step 395. Therefore, because the processing in step 320 is not performed, the discharge control of the smoothing capacitor 32 is not performed.

If the voltage VB of the sub-battery 95 is equal to or higher than the threshold voltage VBth when the CPU executes the processing in step 350, it is determined No in step 350 and the CPU proceeds directly to step 395. Therefore, because the processing in step 320 is not performed, the discharge control of the smoothing capacitor 32 is not performed.

As described above, the vehicle 10 in one exemplary embodiment of the present invention has a motor mounted therein and includes a power control unit (30) that includes a capacitor (32) and a discharge execution unit (35), which executes discharge control for reducing electric charges stored in the capacitor (32), and controls power to be supplied to the motors (21, 22); a first control unit (55) that sends a control instruction signal, which controls the power, to the power control unit (30); and a second control unit (60) that acquires collision information indicating that the vehicle (10) has collided and, is configured to communicate with the first control unit (55), sends the acquired collision information to the first control unit (55) via communication. The first control unit (55) sends an instruction to the discharge execution unit (35) to execute the discharge control if the collision information is received (see step 310 and step 320 in FIG. 3). The first control unit (55) acquires collision prediction information indicating whether there is a possibility that the vehicle will collide (see step 340 in FIG. 3) and, sends an instruction to the discharge execution unit (35) to execute the discharge control either if an abnormality occurs in a communication with the second control unit (60) and, in addition, the collision prediction information indicates that there is a possibility that the vehicle will collide (see step 330, step 340, and step 320 in FIG. 3) or if a voltage VB of an auxiliary power supply (95), which is mounted in the vehicle and supplies power to the first control unit (55) and the second control unit (60), becomes lower than a threshold voltage VBth and, in addition, the collision prediction information indicates that there is a possibility that the vehicle will collided.

The configuration described above prevents the smoothing capacitor 32 from being discharged when the vehicle 10 does not collide, reducing the frequency at which a wasteful load (stress) is placed on the resistor 35a and the switching device 35b. That is, according to the vehicle 10 in one exemplary embodiment of the present invention, even if an abnormality occurs in the communication between the first control unit 55 and the second control unit 60, the discharge control is not executed if the collision prediction information does not indicate a possibility that the vehicle 10 will collide. This means that, when an abnormality occurs in the communication between the first control unit 55 and the second control unit 60 due to a cause other than the collision of the vehicle 10, the discharge control is not executed. This configuration therefore avoids placing a heavy load (stress) on the devices related to the discharge. On the other hand, the vehicle 10 is configured in such a way that, when an abnormality occurs in the communication between the first control unit 55 and the second control unit 60 due to the collision of the vehicle 10, the discharge control can be executed because the collision prediction information indicates a possibility that the vehicle 10 will collide. That is, the vehicle 10 can execute the discharge control even if the first control unit 55 cannot obtain the collision information due to a communication abnormality.

In addition, according to the vehicle 10 in one exemplary embodiment of the present invention, even if the voltage VB of the sub-battery 95 becomes lower than the threshold voltage VBth, the discharge control is not executed if the collision prediction information does not indicate a possibility that the vehicle 10 will collided. This means that, when the voltage VB of the sub-battery 95 becomes lower than the threshold voltage VBth due to a cause other than the collision of the vehicle 10, the discharge control is not executed. This configuration therefore avoids placing a heavy load (stress) on the devices related to the discharge. On the other hand, the vehicle 10 is configured in such a way that, when the voltage VB of the sub-battery 95 becomes lower than the threshold voltage VBth due to the collision of the vehicle 10, the discharge control can be executed because the collision prediction information indicates a possibility that the vehicle 10 will collide.

In the vehicle 10 in one exemplary embodiment of the present invention, the first control unit 55 acquires the collision prediction information by receiving the collision prediction information from the second control unit 60 via communication.

There is a limit to the types of signal that can be input to the first control unit 55. Therefore, as in the exemplary embodiment described above, the first control unit 55 acquires not only the collision information but also the collision prediction information from the second control unit 60 via communication. In this exemplary embodiment, when the collision of the vehicle 10 actually occurs, the first control unit 55 can acquire correct collision prediction information because, before the collision, a communication abnormality is not generated in the communication between the first control unit 55 and the second control unit 60. Therefore, the exemplary embodiment described above allows the capacitor 32 to be discharged without having to increase the number of input ports of the first control unit 55.

The vehicle 10 in one exemplary embodiment of the present invention has motors 21 and 22 mounted therein and includes a power control unit 30 that includes a capacitor 32 and a discharge execution unit 35, which executes discharge control for reducing electric charges stored in the capacitor 32, and controls power to be supplied to the motors 21 and 22; a first control unit 55 that sends a control instruction signal, which controls the power, to the power control unit 30; and a second control unit 60 that acquires collision information indicating that the vehicle has collided and, is configured to communicate with the first control unit 55, sends the acquired collision information to the first control unit via communication. The first control unit 55 sends an instruction to the discharge execution unit 35 to execute the discharge control if the collision information is received, wherein the first control unit 55 acquires collision prediction information indicating whether there is a possibility that the vehicle will collide (see step 340 in FIG. 3) and, sends an instruction to the discharge execution unit 35 to execute the discharge control if an abnormality occurs in a communication with the second control unit 60 and, in addition, the collision prediction information indicates that there is a possibility that the vehicle will collide (see step 330, step 340, and step 320 in FIG. 3).

In addition, the first control unit 55 of the vehicle 10 in one exemplary embodiment of the present invention sends an instruction to the discharge execution unit 35 to execute the discharge control if the collision information is received, wherein the first control unit 55 acquires collision prediction information indicating whether there is a possibility that the vehicle will collide (see step 340 in FIG. 3) and, sends an instruction to the discharge execution unit 35 to execute the discharge control if a voltage VB of an auxiliary power supply (95), which is mounted in the vehicle and supplies power to the first control unit (55) and the second control unit (60), becomes lower than a threshold voltage VBth and, in addition, the collision prediction information indicates that there is a possibility that the vehicle will collide (see step 350, step 340, and step 320 in FIG. 3).

The present invention is not limited to the exemplary embodiment described above but various modifications are possible in the scope of the present invention. For example, the vehicle 10 may determine whether only condition 2 described above is satisfied and, if condition 2 described above is satisfied, discharge the smoothing capacitor 32, and the vehicle 10 may determine whether only condition 3 described above is satisfied and, if condition 3 described above is satisfied, discharge the smoothing capacitor 32. In addition, the vehicle 10 may determine whether one of condition 1 and condition 2 described above is satisfied and, if one of condition 1 and condition 2 described above is satisfied, discharge the smoothing capacitor 32. Furthermore, the vehicle 10 may determine whether one of condition 1 and condition 3 described above is satisfied and, if one of condition 1 and condition 3 described above is satisfied, discharge the smoothing capacitor 32.

In addition, the HV-ECU 60, which works as the second control unit of the vehicle 10, may itself acquire one or both of the collision information and the collision prediction information. In this case, one or both of the collision detection unit 75 and the collision prediction unit 85 are connected directly to the HV-ECU 60. The HV-ECU 60, which works as the second control unit of the vehicle 10, may acquire the collision information by receiving collision information detected by another control unit. The MG-ECU 40, which works as a part of the first control unit of the vehicle 10, may itself acquire the collision prediction information. In this case, the collision prediction unit 85 is connected directly to the MG-ECU 40. In addition, the discharge control circuit may be integrated into the MG-ECU 40.

Furthermore, in place of or in addition to the discharge execution unit 35, the power control unit 30 may include a discharge execution unit that executes MG discharge. The discharge control unit, which executes the MG discharge, controls one or both of the first inverter 33 and second inverter 34 in such a way that electric current flows to one or both of the motor generator 21 and the motor generator 22 while preventing one or both of the motor generator 21 and motor generator 22 from generating torque.

The invention claimed is:

1. A vehicle in which a motor is mounted, the vehicle comprising:
a power control unit that includes a capacitor and a discharge execution unit, which is configured to execute discharge control for reducing electric charges stored in the capacitor, and which controls power to be supplied to the motor;
a first control unit configured to send a control instruction signal, which controls the power, to the power control unit,
a second control unit configured to communicate with the first control unit; and
an auxiliary power supply that supplies operating power to the first control unit and the second control unit, wherein
the first control unit is configured to:
acquire collision prediction information indicating whether there is a possibility that the vehicle will collide,
determine whether both an abnormality has occurred in the communication between the first control unit and the second control unit, and the acquired collision prediction information indicates that there is the possibility that the vehicle will collide, and
responsive to determining that both the abnormality has occurred in the communication between the first control unit and the second control unit, and the acquired collision prediction information indicates that there is the possibility that the vehicle will collide, send a discharge instruction to the discharge execution unit to execute the discharge control, thereby sending the discharge instruction in the case that both (i) the abnormality has occurred with the communication between the first control unit and the second control unit, and (ii) the acquired collision prediction information indicates that there is the possibility that the vehicle will collide.

2. The vehicle according to claim 1, wherein the first control unit acquires the collision prediction information by receiving the collision prediction information from the second control unit via the communication.

3. The vehicle according to claim 1, wherein the second control unit is configured to acquire collision detected information indicating that the vehicle has collided, and to send the acquired collision detected information to the first control unit via communication, and the first control unit is configured to send the discharge instruction to the discharge execution unit to execute the discharge control responsive to receiving the collision detected information from the second control unit.

4. The vehicle according to claim 1, wherein the first control unit and the second control unit are separately formed and are electrically connected to each other.

* * * * *